H. G. McCOOL.
TYPE WRITING MACHINE.
APPLICATION FILED FEB. 13, 1909.
943,444.
Patented Dec. 14, 1909.
11 SHEETS—SHEET 1.
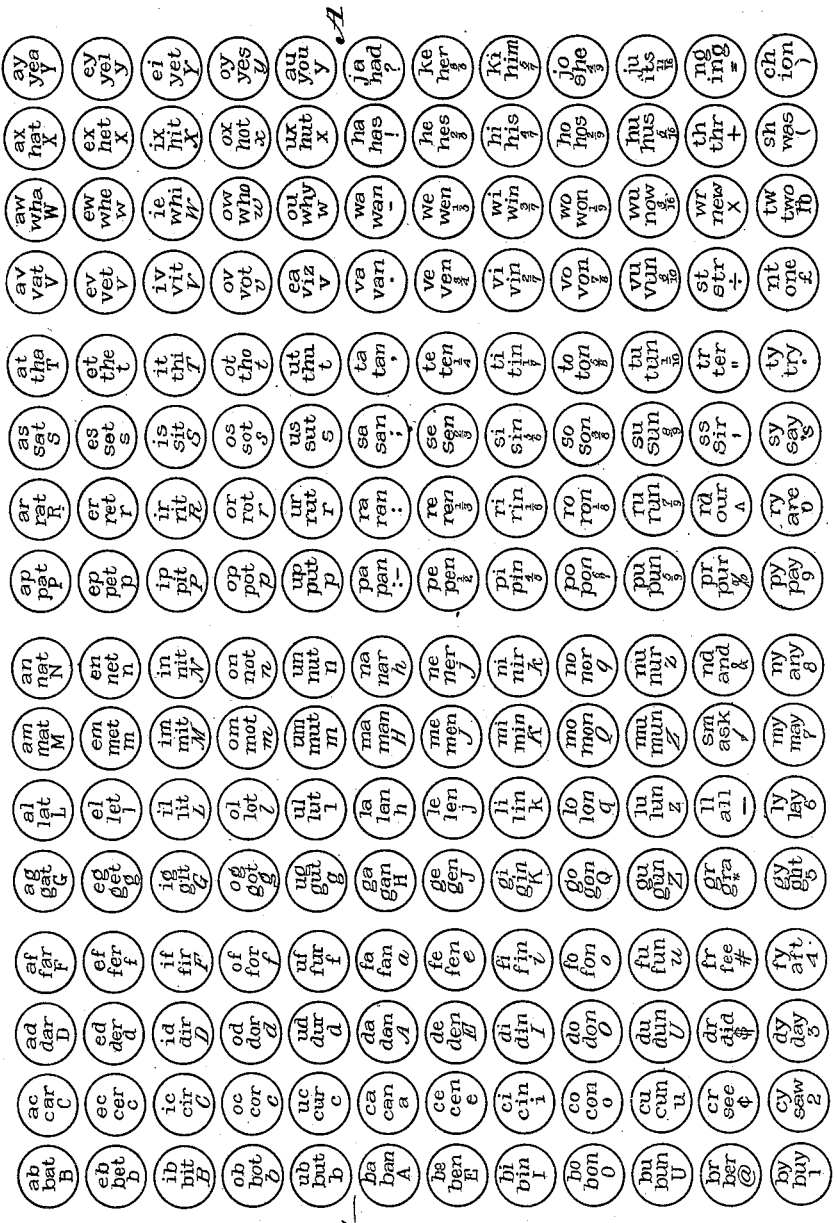
WITNESSES
INVENTOR
HENRY GAYLORD McCOOL
BY
ATTORNEYS

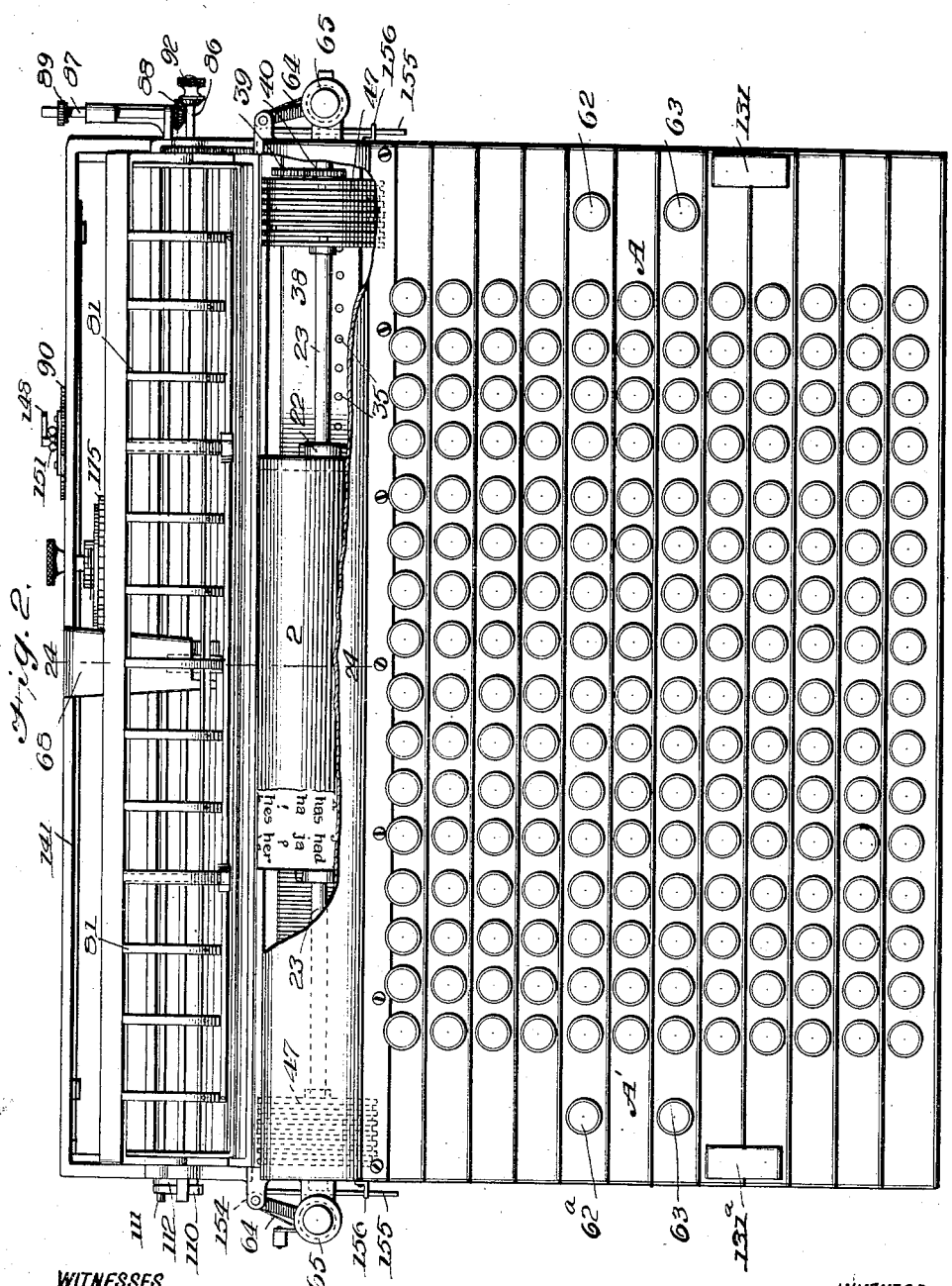

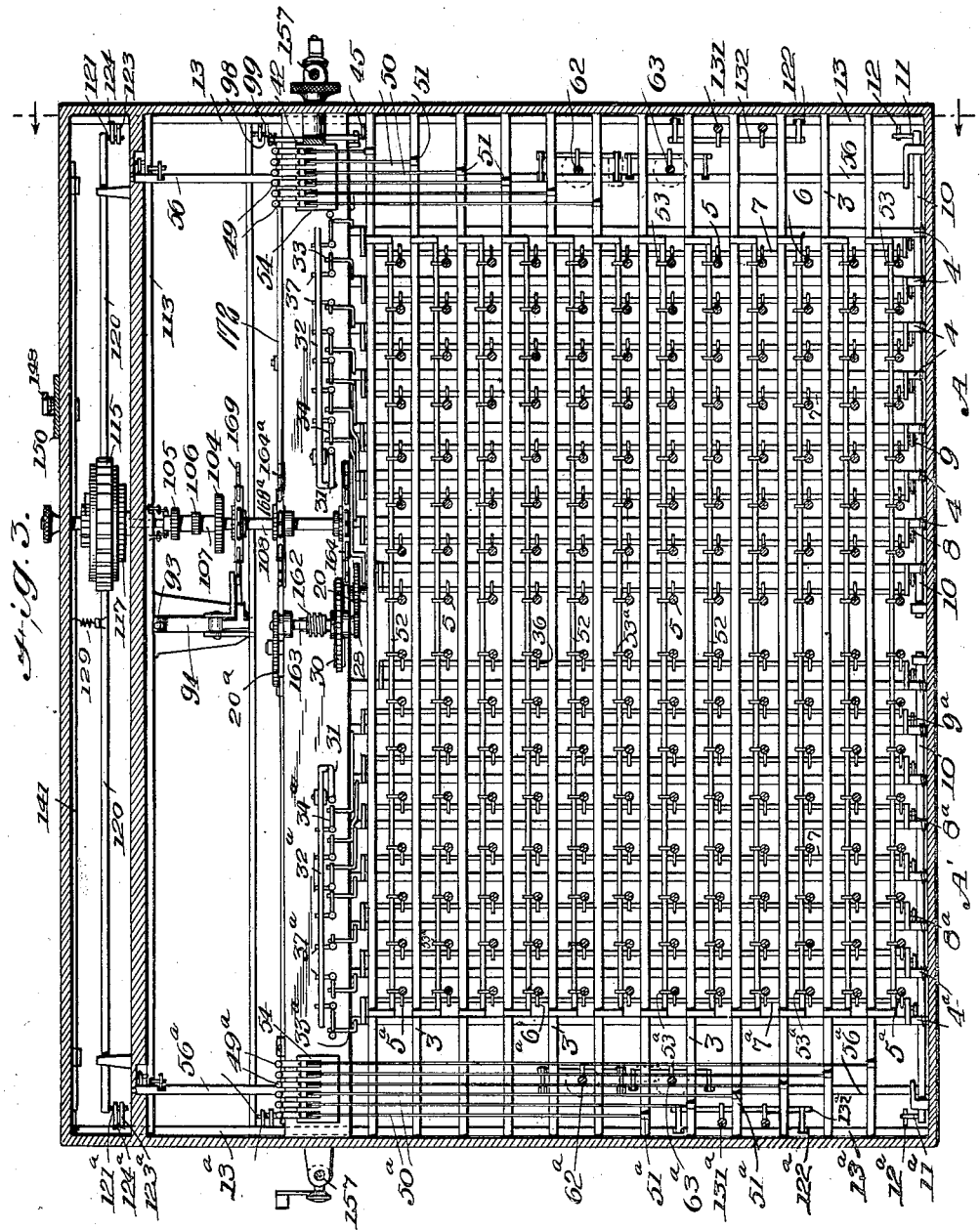

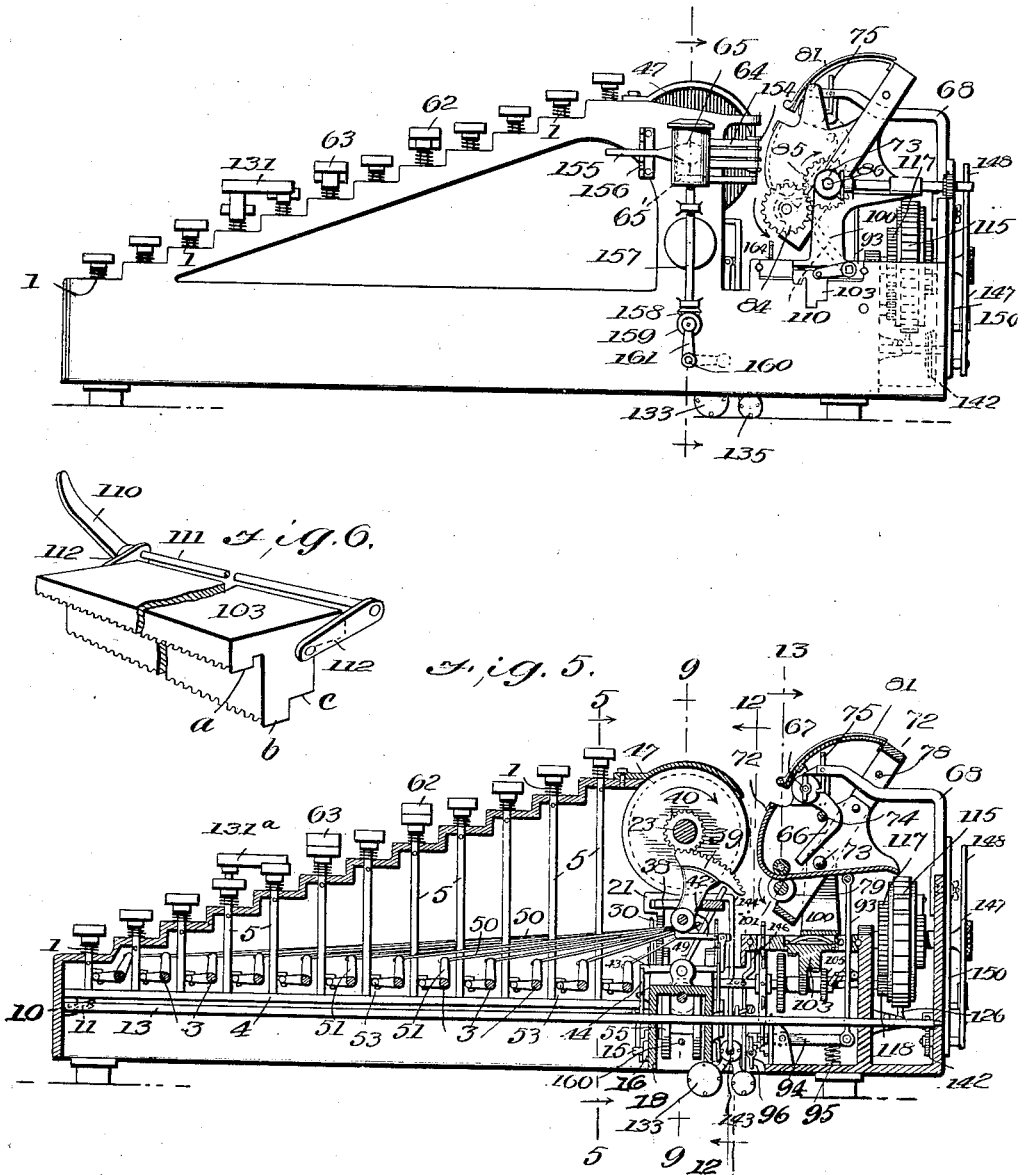

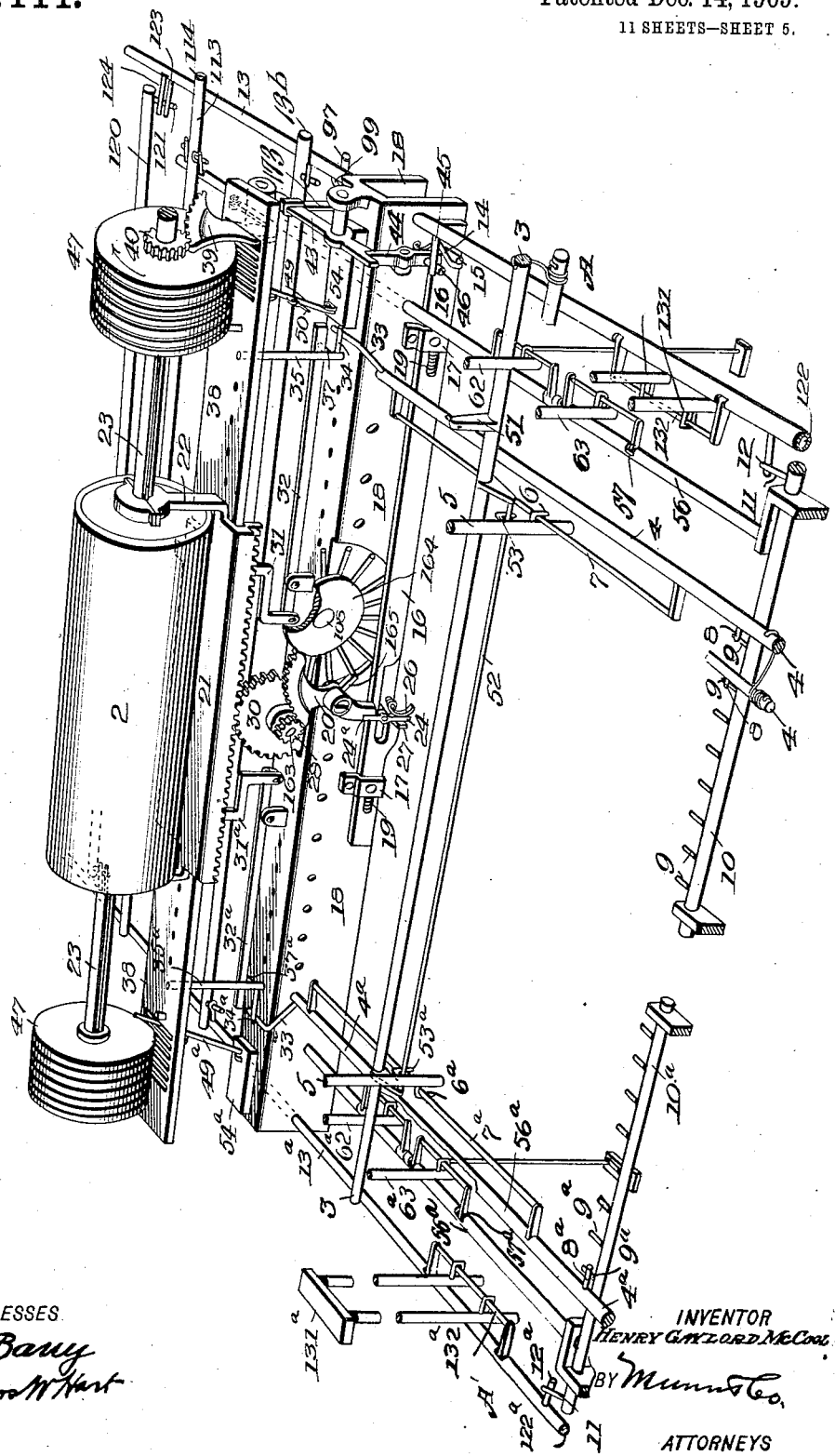

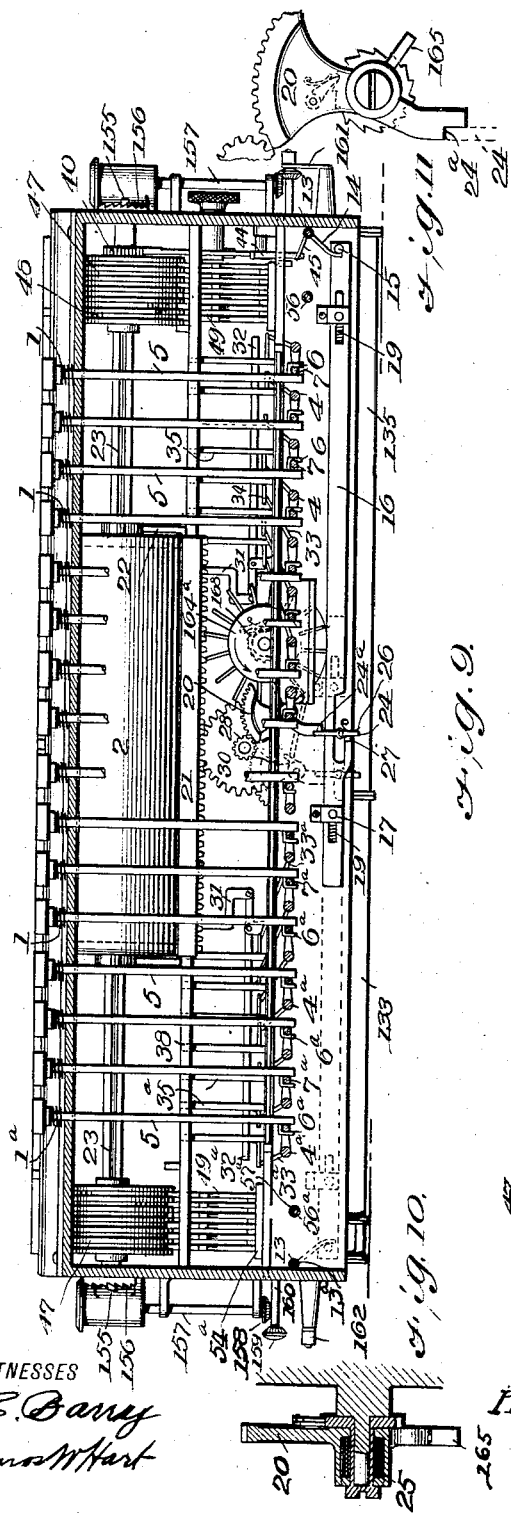

H. G. McCOOL.
TYPE WRITING MACHINE.
APPLICATION FILED FEB. 13, 1909.
943,444.
Patented Dec. 14, 1909.
11 SHEETS—SHEET 7.
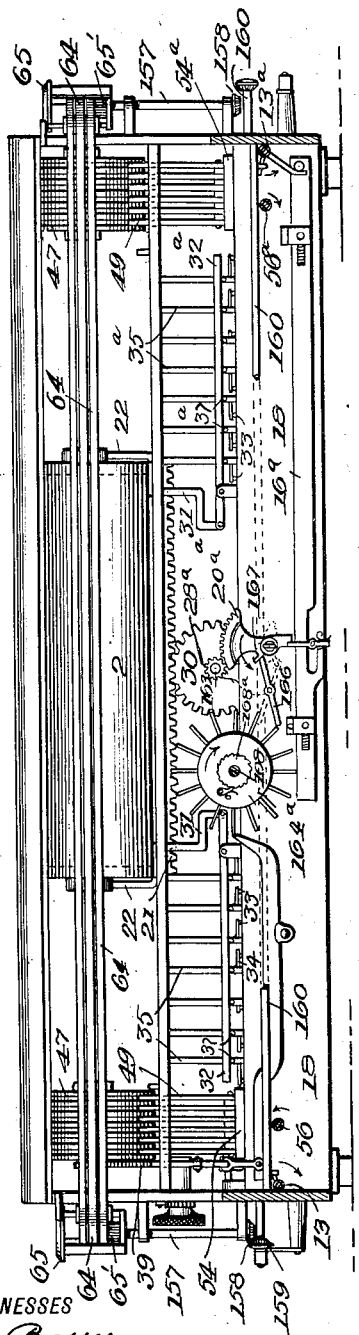
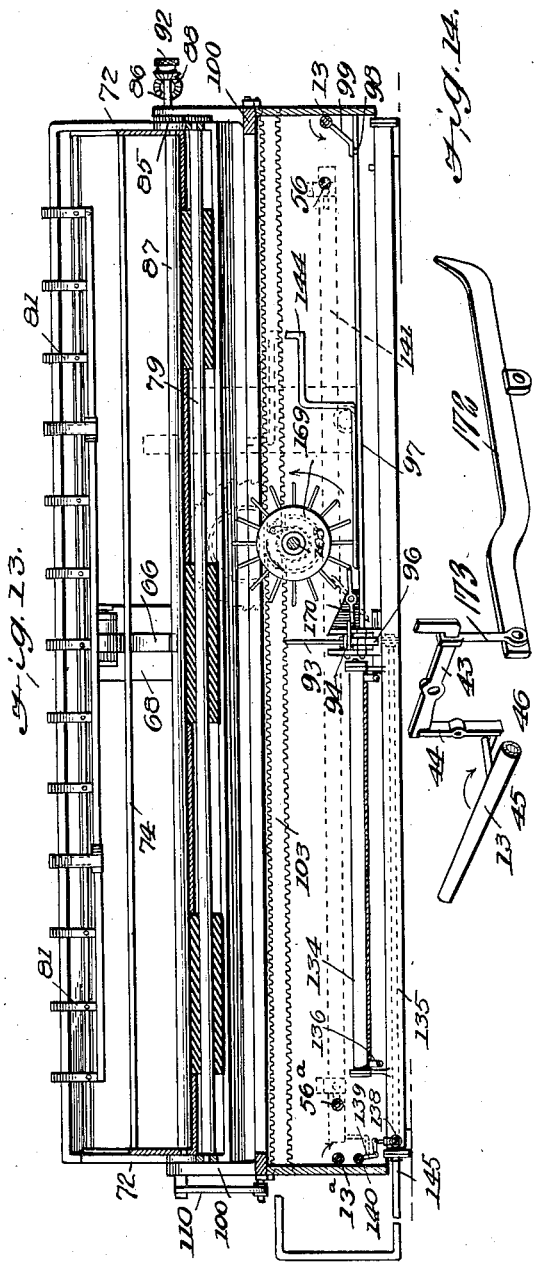
WITNESSES
INVENTOR
HENRY GAYLORD McCOOL
BY
ATTORNEYS

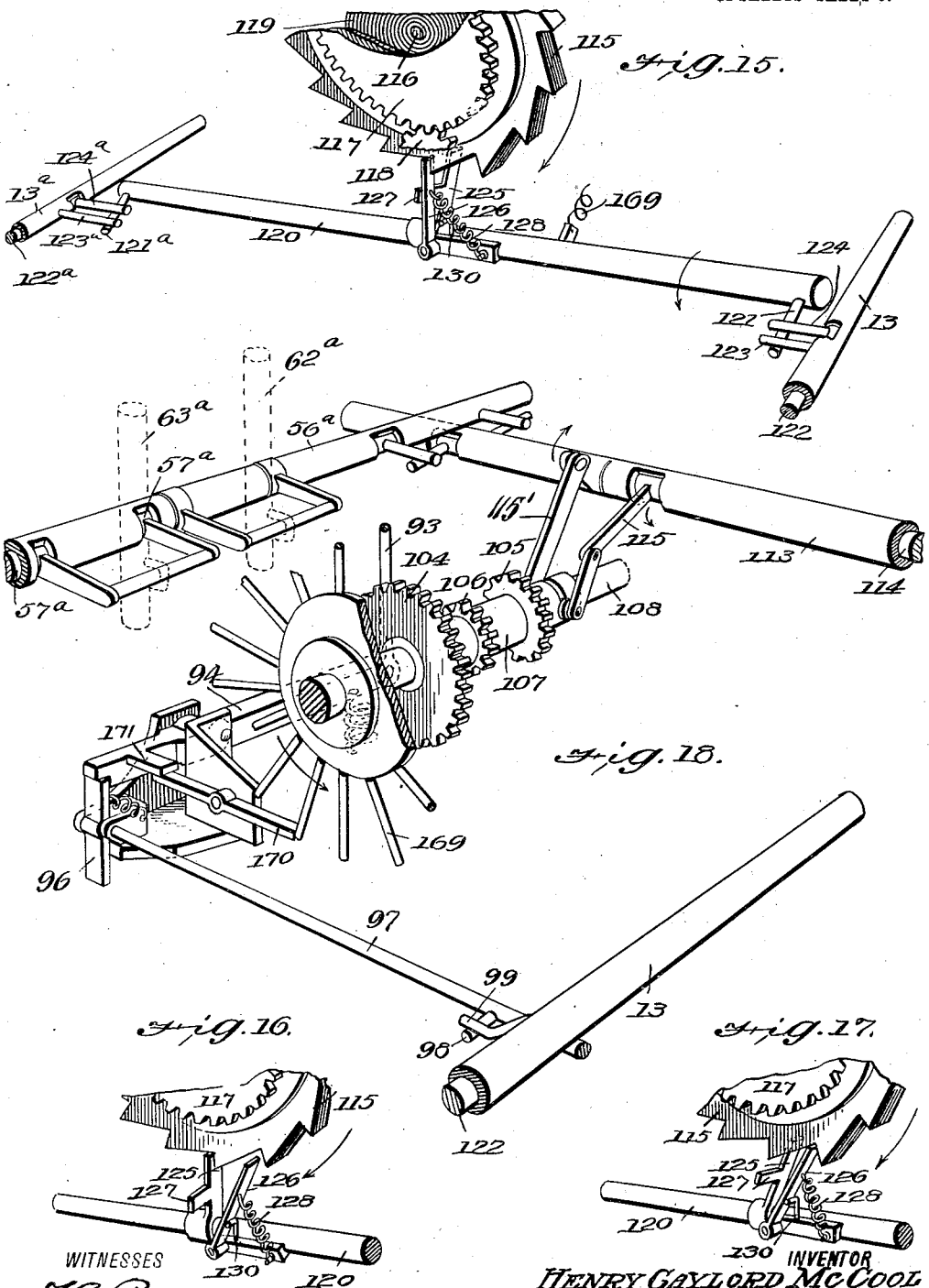

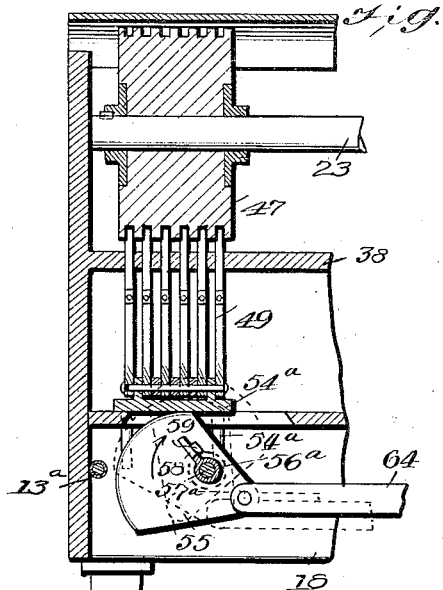
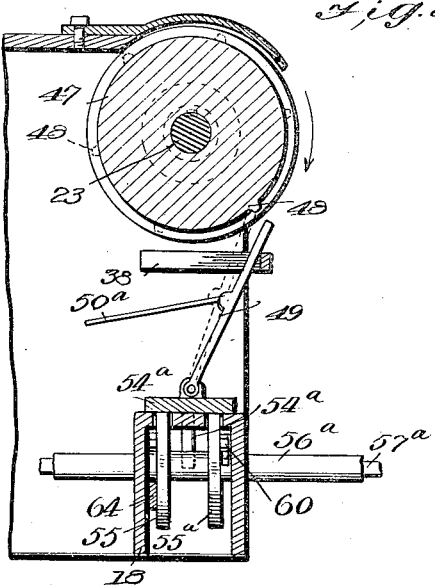
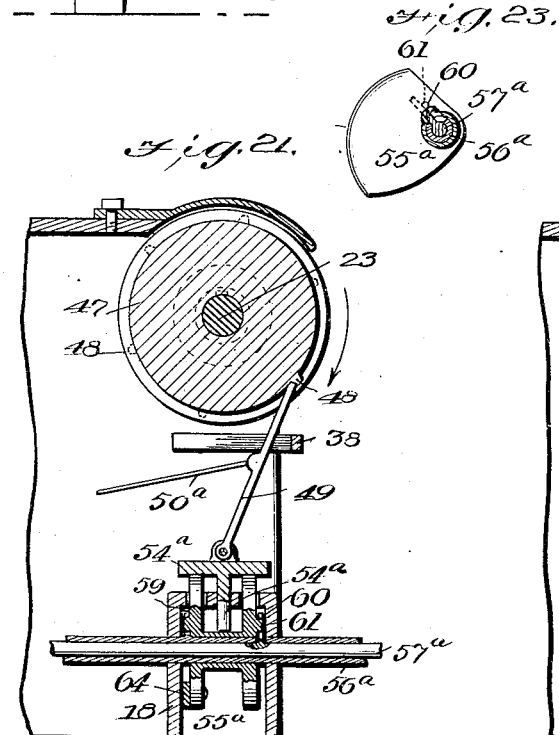
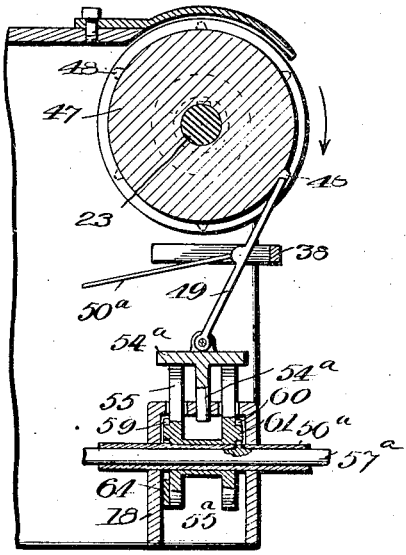

H. G. McCOOL.
TYPE WRITING MACHINE.
APPLICATION FILED FEB. 13, 1909.
943,444.
Patented Dec. 14, 1909.
11 SHEETS—SHEET 10.
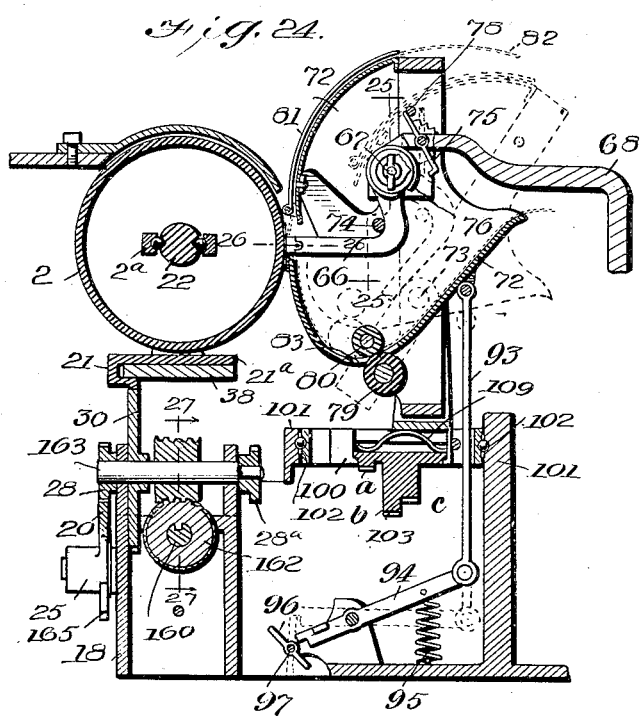
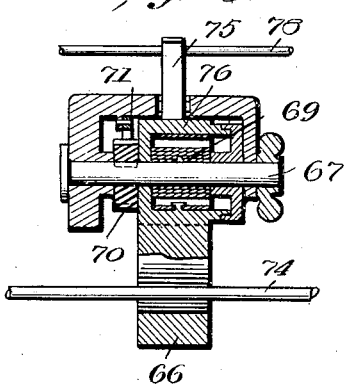
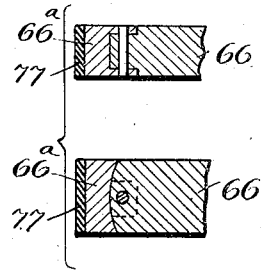
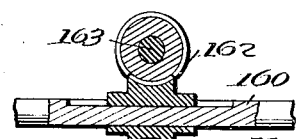
WITNESSES
INVENTOR
HENRY GAYLORD McCOOL
BY
ATTORNEYS

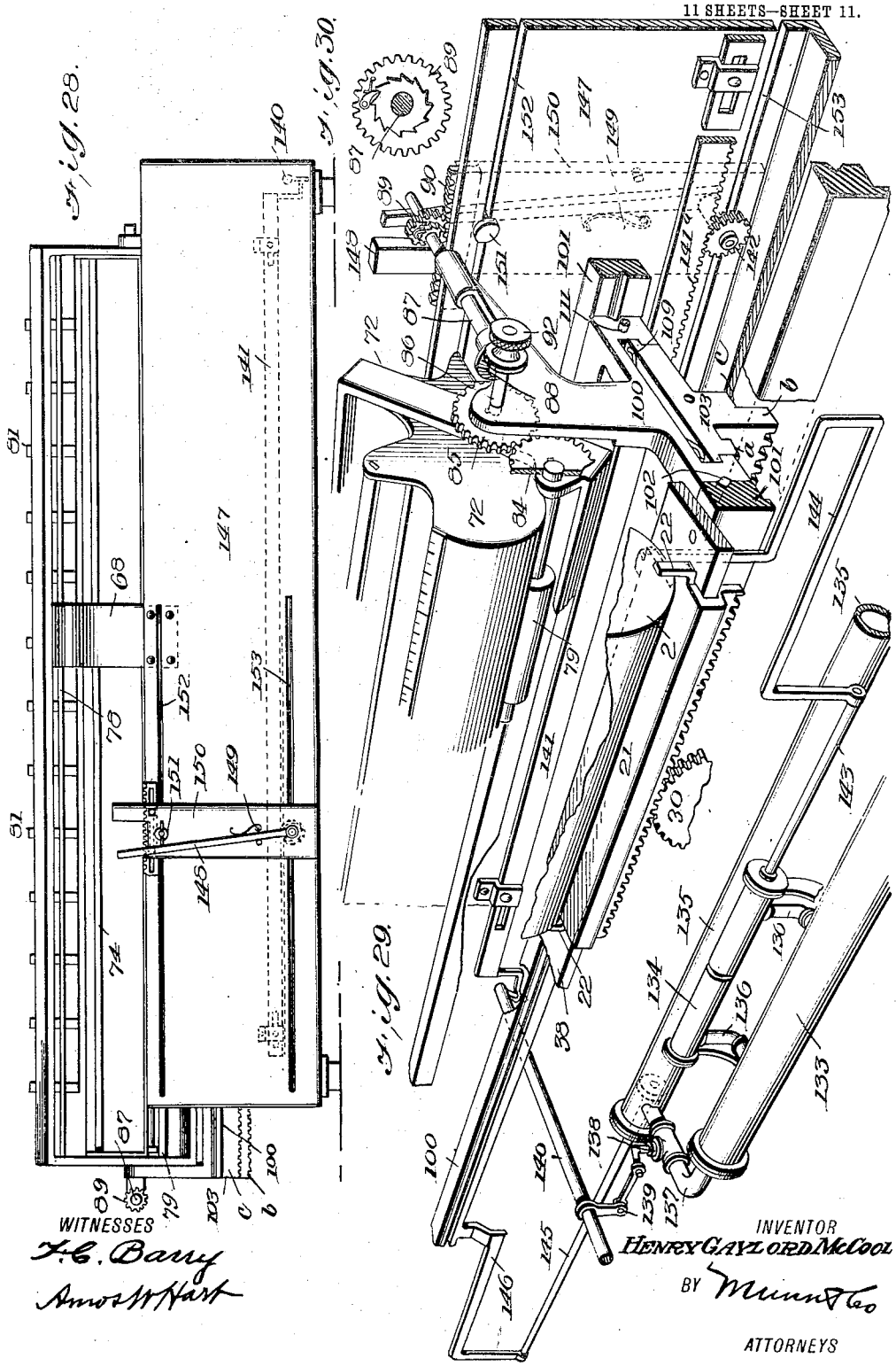

UNITED STATES PATENT OFFICE.

HENRY GAYLORD McCOOL, OF CARMICHAELS, PENNSYLVANIA.

TYPE-WRITING MACHINE.

943,444. Specification of Letters Patent. Patented Dec. 14, 1909.

Application filed February 13, 1909. Serial No. 477,487.

*To all whom it may concern:*

Be it known that I, HENRY GAYLORD Mc-COOL, a citizen of the United States, and a resident of Carmichaels, in the county of Greene and State of Pennsylvania, have invented an Improvement in Type-Writing Machines, of which the following is a specification.

I have received Letters-Patent of the United States No. 886,148, dated April 28, 1908, for an improved syllabic keyboard for typewriters and type-setting machines, in which invention, the keyboard has 192 keys, the same being arranged in twelve horizontal rows of sixteen keys each, and each key bearing three symbols, to wit, a single letter and two syllables of two and three letters respectively. By use of such keyboard, great speed in writing may be attained.

My present invention is a complete typewriting machine designed and adapted for, and provided with, such keyboard or one practically the same.

In the accompanying drawings Figure 1 is a plan view of the keys of the keyboard showing their grouping or arrangement, and the letters or other characters with which they are inscribed. Fig. 2 is a plan view of the machine with portions broken away to show interior construction. Fig. 3 is a horizontal section of the machine. Fig. 4 is an end view of the machine. Fig. 5 is a vertical section taken adjacent to one end of the machine. Fig. 6 is a perspective view of the multiple rack which is connected with the printed cylinder or drum for reciprocating it endwise. Fig. 7 is a perspective view particularly designed for illustrating the operation of certain important portions of the mechanism. Fig. 8 is a vertical section on the line 8—8 of Fig. 5. Fig. 9 is a vertical section on the line 9—9 of Fig. 5. Fig. 10 is a detail section of a segment gear which operates the rack by which the printing drum or cylinder is reciprocated. Fig. 11 is a side view of the gear shown in Fig. 10. Fig. 12 is a vertical cross section on the line 12—12 of Fig. 5. Fig. 13 is a similar section on the line 13—13 of Fig. 5. Fig. 14 is a perspective view of lever trip mechanism which is connected with the segment levers that rotate the printing drum or cylinder. Fig. 15 is a perspective view of an escapement and connected mechanism for governing the spacing of words. Figs. 16 and 17 are additional perspective views further illustrating the operation of parts shown in Fig. 15. Fig. 18 is a perspective view of mechanism including shiftable gears coacting with the multiple rack for reciprocating the paper holder and carriage as required for printing a single letter, two letters or three letters, as may be required. Figs. 19 to 23 inclusive are sectional views illustrating the means for controlling the rotation of the printing drum or cylinder as required for printing a single letter, two letters, or three letters. Fig. 24 is a vertical section on the line 24—24 of Fig. 2. Fig. 25 is a detail section on the line 25—25 of Fig. 24. Fig. 26 is a detail section on the line 26—26 of Fig. 24. Fig. 27 is a section on the line 27—27 of Fig. 24. Fig. 28 is a rear elevation of the machine with the carriage adjusted to the left. Fig. 29 is a perspective view illustrating the carriage and paper holder together with means for returning the same. Fig. 30 is a sectional view showing ratchet and gear for adjusting the paper in the holder.

As previously stated, the keyboard has 192 keys, the same being arranged in twelve rows extending lengthwise of the machine frame, and there being sixteen keys in each row, as shown in Figs. 1 and 2. The keys are all depressible and supported by springs 1 coiled about their stems as shown in Figs. 4, 5. The keys are divided transversely into two groups or banks, one-half being located on the righthand and the other half on the left as indicated by letters A, A', in Figs. 1 and 2. When a key in the righthand group A is depressed, the printing cylinder or drum 2 is shifted to the right, and when a key in the lefthand group A' is depressed, the cylinder is shifted in the opposite direction, or to the left. This is effected, primarily, by a rack attached to the printing cylinder 2, with which gearing is adapted to engage, the gearing being duplicated for moving the rack right and left, and actuated by duplicate mechanism arranged on the right and left beneath the respective groups of keys A, A'.

The mechanism for moving the cylinder to the right will be first described. There are twelve shafts 3—see Figs. 3 and 7—extending parallel to each other from right to left, and sixteen shafts 4 extending parallel to each other from front to rear and thus arranged at right angles to, as well as beneath, the shafts 3. All these shafts are journaled 11 in the frame so as to be adapted to rock or oscillate, and each transverse shaft 4 is provided with a lateral attachment 7, in the nature of a lever, the same consisting of a rod arranged parallel to the shaft and attached to arms of the latter. The vertical stem 5 of each key is provided with a prong 6 (see Figs. 7 and 8) under which the lever rod 7 passes. Near its front end, each shaft 4 is provided with a finger 8 that engages another finger 9 on a shaft 10, which is arranged at the front of the machine parallel thereto. Such shaft 10 is in turn provided with a finger 11 that bears upon a corresponding finger 12 of a hollow shaft 13, which extends parallel to the right-hand end of the machine. This shaft 13 is provided with a curved finger 14 that engages a pin 15 on a slidable bar 16 arranged transversely of the machine, that is to say, parallel to the shafts 3. This bar is held in guides 17 which are attached to a channel piece 18, forming a part of the frame of the machine. Spiral springs 19 are attached to the bar and the keepers on the left-hand side of the latter. It will now be apparent that, when a key 5 is depressed, a shaft 4 will be rocked or turned on its axis, and that this in turn will rock the shafts 10 and 13, whereby the finger 14 of the latter will draw the bar 16 to the right. This movement releases or unlocks a pivoted segment gear 20, which operates the gearing connected with the sliding rack 21 by which the cylinder 2 may be moved to the right.

Each rock-shaft 4 and all of the rock-shafts that require the attachment, are provided with springs for returning or rocking them back to normal position. These springs may be arranged as shown in Fig. 7, where one is applied to a shaft 4, it being coiled about, and secured to, said shaft, and its tail or free end projecting under an adjacent shaft. Instead of the latter arrangement, it is obvious the spring might project under any other part of the machine, say a portion of the frame.

As shown in Fig. 7, the rack is provided with vertical arms 22 between which the cylinder 2 is arranged, the latter being adapted to slide on a transverse shaft 23.

In the normal position, the segment gear 20 is locked by a pivoted dog 24, which engages the notched shank 24ª of the same; see Figs. 7 and 11. A coiled or volute spring 25, see Fig. 10, is attached to the hub of the gear 20 and tends to rotate the same to the left (Fig. 7). The dog 24 is held in its normal position by a curved spring 26 that bears against its lower end. The bar 16 is provided with a lug 27 which engages the lower end of the dog 24, and when the bar is drawn to the right, as before described, against the tension of the springs 19, the lug 27 trips the dog 24 so that it is released from engagement with the shank of segment gear 20, and the latter being thus left free, its spring 25 rotates it and thereby, through coaction with a pinion 28, rotates a large spur gear 30 to the right. Such gear engages the outer member of the rack 21, and consequently the cylinder 2 is moved to the right. The cylinder 2 is held locked in normal central position and it is stopped in its movement to the right by means which will now be described, as shown in Figs. 7, 8, 9 and 12. A right-angular dog 31 is pivoted to the short arm of a horizontal lever 32, and the longer arm serving as a weight, holds the dog normally engaged with a stop plate 21ª (see Fig. 9) which forms a part of the rack 21 (see Fig. 7). It is obvious that if the longer arm of the lever 32 be raised, the dog 31 will release the rack so that it may be slid to the right. This is effected by means of a curved arm or prong 33 projecting from each shaft 4 and engaging a prong 34 on a vertically slidable rod 35 having also a prong 37 that projects beneath the lever 32. The slidable rod 35 works in a hole provided in the frame bar 38 whereon the rack 21 slides, and it is apparent that the rod 36 will be projected upward into the path of the rack simultaneously with the release of the rack by the dog 31. In other words, by locking the shaft 4, which occurs whenever its key is depressed, there occur three simultaneous operations; first, the segment gear 20 is released so that its spring will operate the wheel 30 and thereby move the rack 21, and with it the cylinder 2, to the right; secondly, the dog lever 32 is raised and the dog 31 drawn downward to release the rack; and thirdly, a stop 35 is raised and interposed in the path of the rack so as to arrest the cylinder at the right point. It will be seen that, if the key depressed is at the extreme right of the keyboard, then the shaft 4, which is rocked, and the stop pin 35, which is projected above the surface of bar 38, will be those on the extreme right. Similarly, if a key in the innermost row of group A be operated, a corresponding shaft 4 and stop 36 will be operated. It is apparent, therefore, that the position of the shafts 4 and stop pins 35 corresponds to the location of the key from right to the left and front to rear.

As has been before intimated, the mechanism thus far described for moving the cylinder to the right is practically duplicated on the left of the machine, for moving the cylinder to the left, and it is, therefore, unnecessary to describe the same in detail. In the drawing, in order that the correspondence or duplication of parts may be understood, I have marked the duplicate mechanism on the left with numerals corresponding to those on the right, save that they bear the index a.

In addition to the movement of the cylinder to the right or left in order to bring a certain letter in front of the hammer, it is also necessary to rotate it. As before stated, the cylinder has a spline connection with the rotary shaft 23 and, therefore, always rotates with it. The rotation of the shaft is effected by means of a pivoted segment gear 39 (see Fig. 7), which engages a pinion 40 on the shaft 23. The head of this gear 39 is provided (see Fig. 9) with a spring 41 similar to the gear 20, Fig. 10, which rotates it when it is unlocked. The direction of the rotation is indicated by an arrow in Fig. 7. As shown in Fig. 5, the gear 39 has a later alarm 42 which is pivotally connected with a right angular lever 43, see also Fig. 14, which is pivoted centrally and is normally locked by a pivoted dog 44. When this dog is tripped and the lever 43 released, the spring 41 of gear 39 rotates it and thereby rotates the shaft 23 and cylinder 2, as already indicated. The dog 44 is thus tripped through its engagement with the hollow rock-shaft 13, before described. That is to say, such shaft is provided with a lateral arm or prong 45 that engages a similar one 46 on the dog 44, see especially Figs. 7 and 14. The dog 44 may also be tripped from the lefthand side of the machine through the medium of a shaft 13$^b$ (see Fig. 7) arranged under the cylinder and operatively connecting shafts 13 and 13$^a$.

It will now be apparent that practically simultaneously with the operations before described by which the cylinder 2 is shifted to the right, it is also rotated more or less corresponding to the location in the keyboard of any key which is depressed. In other words, if the key be located at the top of the keyboard or at the bottom of the keyboard, it is obvious the rotary movement of the cylinder 2 must correspond, being much greater in one instance than in the other. The rotation of the cylinder due to the action of the spring connected with the segment gear 39 requires to be arrested at the right time. When a single letter is to be printed, the arrest of the rotation of the cylinder is effected by the following means. A grooved drum 47 is fixed on each end of the shaft 23. Each one is provided with six grooves that are arranged parallel and circumferentially. In the bottom of each groove, there is a series of stops 48, see Figs. 19-22, with which lock bars 49 are adapted to engage (see Fig. 20). A rod 50 connects each of the six lock bars 49 with an arm or lug 51, see Fig. 7, which forms an attachment of each transverse shaft 3. The lock bars 49 project upward through transverse guide slots in the frame bar 38. It is obvious that when a shaft 3 is rotated, the rod 50 will raise or draw the lock-bar 49 upward into position to engage a stop 48 on the drum 47 thereby arresting it at the right point, that is to say, so that the single letter on the cylinder which it is desired to print will be brought to the right point opposite the hammer.

As shown in Figs. 3 and 7, each of the crosswise shafts 3 is provided, like the shafts 4, with a lever attachment consisting of a rod 52 which extends parallel to the shaft, and each key stem on the right is provided with a keeper 53 through which said rod passes. Thus, when the key is depressed, its stem 5 not only rocks a shaft 4, with the effect of moving the cylinder to the right and also rotating the same, but it likewise rocks a lengthwise shaft 3 and thereby stops the rotation of the cylinder at the required point.

By observing Fig. 3, it will be seen that all the stop-bars 49 on the right are connected by rods 50 with the first or nearest six lengthwise shafts 3, but that on the left, the corresponding rods 50$^a$ are extended to and connected with the lower six lengthwise shafts 3. This arrangement is adopted in order to avoid placing a drum having twelve grooves, instead of six, on one end of the shaft 23. In other words, by using two drums 47 provided with six grooves each, and by the arrangement of rods 50, 50$^a$, as described, the construction of the machine is rendered more practical and symmetrical.

So far, I have described the construction and operation with respect to the grooved drums 47 and the stop mechanism connected therewith with respect only to the printing of a single letter, but when it is desired to print two or three letters as the case may be, it is necessary to employ adjunctive mechanism. When a single letter is to be printed, the cylinder 2 is allowed to rotate farther than when two letters or three letters are to be printed. When two letters are to be printed, the lock-bars 49 are raised bodily so as to engage a stop 48 on the grooved drums sooner than would otherwise be the case; and similarly, when three letters are to be printed, the lock-bars 49 are raised to a still greater height, as will be seen by reference to Figs. 21, 22. When a single letter is to be printed, therefore, the base 54 rests at its lowest point, as shown in Figs. 19, 20; but when two letters are to be printed, such base piece 54 is raised to a certain height, as in Fig. 21; and for three letters, it is raised still higher, as shown in Fig. 22. This movement is effected by cams 55, 55$^a$, which are arranged parallel and rigidly connected and mounted loosely on a hollow shaft 56 through which passes a solid shaft 57. The hollow outer shaft 56 is provided with an arm 58 that engages (see Fig. 19) a lug 59 on the cam 55. Hence, if the shaft 56 be rotated, the cam 55 will be raised correspondingly and thereby the base piece 54 will be forced upward and the lock bars 49 pivoted thereon will be carried upward to a corresponding height, see Fig. 22.

Cam 55ª is for raising the base piece 54 as required for printing two letters, see Fig. 21. It will be observed that the base piece 54 has two guide pins 54ª that work in guide holes in the channel bar 18. When it is desired to print two letters this is effected on either side of the machine. In Figs. 19–23, I show the means for effecting it on the left side. The inside shaft 57 is provided with an arm 60 adapted to engage a lug 61 formed on the cam 55ª. This lug is arranged in such manner that said cam will be raised higher than the cam 55 in the operation before described. The two sets of cams are duplicated at the ends of the frame of the machine and are connected so as to operate simultaneously, by means of a bar 64; see Figs. 9 and 19.

The means for rocking the two cam-actuating shafts 56ª and 57ª whereby the lock-bars 49 are raised more or less as required for the purpose stated, are the following: As shown in Fig. 2, two keys 62 and 63 are arranged at the right and left of the regular keyboard, composed of groups A, A'. The key 62 is depressed when it is required to print three letters, and the key 63 is depressed for two letters. The stems of these keys obviously require to be connected with the respective shafts 56 and 57 and 56ª and 57ª, in order to effect the desired result. The manner of connecting these parts is illustrated in Fig. 7 where a stem of key 62 is shown connected with the hollow shaft 56, and the stem of key 63 is similarly connected with the inner or solid shaft 57, the means of connection being in each case similar to the connections before described between the keys of the keyboard proper and the shafts 3 and 4. It is understood that this arrangement is duplicated on opposite sides of the machine.

As shown in Figs. 2, 4, 8, 12, a series of differently colored ribbons 64 are wound on drums 65', the latter being located at the ends of the machine frame, and provision being made for the vertical adjustment of the ribbons in front of the printing cylinder 2, as will be presently described. The hammer 66 (see especially Figs. 5 and 24) is constructed, arranged, and operated in such manner as to deliver a blow against the paper and the ribbon and thereby force the latter against the opposite portion of the printing cylinder bearing the particular letter or letters which are to be printed. The hammer is curved at nearly a right angle and is pivoted on a short shaft 67 which, as shown in Figs. 24, 25, passes through the forked end of a rigid support 68 forming an attachment of the back portion of the frame of the machine. A plate spring 69 is coiled about the shaft 67 and attached thereto. On the left hand portion of the shaft 67 is keyed a ratchet 70 that is engaged by a pawl 71, which is pivoted to the support 68. Thus by rotating the shaft 67, the tension of the spring may be increased and its tension will be retained by means of the pawl and ratchet. A device 72, in the nature of a receptacle and guide for the paper that is to be typewritten, is arranged as shown in several figures, see especially 4, 5, 24, and 29, and the same is pivoted at 73, see Fig. 5, to rigid supports so that it is adapted to oscillate thereon in a vertical plane. A rod 74 extends through the paper holder 72 from right to left and in front of the short arm of the hammer 66. Consequently, when the paper holder 72 is thrown back or occupies the normal position which is shown in Figs. 4 and 5, such rod retracts the hammer to the position there shown and against the tension of its spring 69. The hammer is held locked in this position by means of a dog 75 that is pivoted to the support 68, and its lower end engages a drum 76 in which the hammer spring 69 is coiled. If the paper-holder 72 be thrown forward from the normal position shown in Figs. 4, 5, to the position shown in Fig. 24, the dog 75 is released and consequently the spring throws the hammer 66 forward and into contact with the paper that lies in front of the ribbon, and thus printing is effected.

The face or working end 66ª of the hammer is pivoted as shown in Fig. 26, and also provided with a rubber face 77. The dog 75 is tripped by means of a rod 78 which traverses the frame of the paper holder 72 and when the latter is thrown forward such rod strikes the upper end of said dog as shown in Fig. 24. The paper to be printed is guided along the lower or back portion of the holder 72 and between two rubber-covered rollers 79 and 80, and thence upward across the slot or side opening in the paper-holder and under a curved plate spring 81 which is attached to and normally lies close to the peripheral upper portion of the holder. The paper is indicated at 82 by dotted lines; see Fig. 24. The rollers 79 and 80 are carried by the holder 72, one (79) being arranged exterior to, and the other within, the body of the same, and the holder being provided with a lengthwise slot 83 as shown, to permit the paper to be held between the rollers with the required friction. The inner roller 80 is an idler and works by frictional contact with the outer one, whose shaft is provided with a spur gear 84 that meshes with the corresponding gear 85; see Figs. 4 and 29. The gear 85 is keyed on a shaft 86 that constitutes one of the pivots of the paper-holder 72, and the shaft is driven by shaft 87 arranged at right angles thereto and operatively connected with it by means of miter gearing 88. A spur gear 89 is mounted loose on the outer portion of the shaft and runs on a rack 90 forming a horizontal attachment of the frame. As shown in Figs. 29 and 30, a ratchet and pawl 91 serve to operatively connect the spur gear 89 with the shaft, so that when the paper-holder is moved in one direction, intermittently the paper will be advanced as required.

It is often requisite that the paper shall be adjusted in the paper-holder 72 independently of the automatic operation of the mechanism just described, and for this purpose, I provide the shaft 86 with a milled disk 92 so that it may be rotated manually. The operation is obvious without further description.

The adjustment or throw of the paper-holder 72 from the normal position shown in Figs. 4, 5, to the printing position shown in Fig. 24, is effected by the following means: A vertical rod 93, see Figs. 5 and 24, serves to connect the rear portion of the paper-holder with a lever 94, that is pivoted on the base portion of the machine, and its longer arm pressed upward by a spring 95. A pivoted dog 96 is arranged for engaging the shorter arm of the lever 94, so as to hold it normally down or in the horizontal position, the spring 95 being then compressed as shown in Fig. 5. The engagement of the dog 96 with the lever 94 is more plainly shown in Fig. 18. The dog is keyed on a shaft 97 which extends horizontally in a plane parallel to the rear side of the machine. Such shaft is rocked by engagement of its prong 98 with a like prong 99 on the hollow shaft 13, see Figs. 7 and 18, and the latter, as has been previously described, is operated through its mechanical connection with the front shaft 10 with which all the transverse key shafts 4 are in turn connected. Thus wherever a key is depressed, the shaft 97 is rotated and the dog 96 is tripped or disengaged from the lever 94, with the result that the paper-holder is thrown into the forward position shown in Fig. 24 and the hammer 66 also operated to effect the printing.

The paper-holder is pivoted in rigid supports of what may be termed a carriage 100, which, as shown in Figs. 5, 24, 28, 29, is adapted to slide horizontally between ways or guide bars 101, the inner sides of these two parts being provided with grooves adapted to receive balls 102 whereby an anti-friction bearing is provided as shown in Fig. 24. The underside of this carriage supports and carries a device in the nature of a multiple rack 103; see especially Figs. 6, 24, 29. The racks are indicated, respectively, by letters a, b, c, and are at different elevations whereby they are adapted for engagement with three different gears, to wit, 104, 105, 106, see Figs. 5 and 18. These gears are all keyed on a sleeve, or hollow shaft, 107, which is mounted slidably on a solid shaft 108 that is arranged transversely in the center of the rear portion of the machine and is rotated by connection with an escapement, as will be hereinafter described. When the larger gear 104 is engaged with the rack a, the machine is operated for printing three letters, but when the gear 105 is in mesh with the rack c, two letters will be printed, and similarly when the smallest or intermediate gear 106 is in mesh with the middle and lowest rack b, a single letter is printed. In Fig. 5 the middle gear 106 is shown in mesh with the middle rack b. It will be noted that the arrangement of the racks and gears just described is such that whenever a gear is engaged with a rack, the two other racks and gears are out of engagement, so that said rack is free to be operated by that particular gear.

It is often requisite that the carriage may be shifted manually instead of automatically and for this purpose the multiple rack 103 is adapted for vertical adjustment so that it may be removed from engagement with any of the gears described. As shown in several figures, see especially Fig. 24, the side edges of the rack are provided with lateral flanges or shoulders that ride on the corresponding flanges of the carriage proper 100, and plate springs 109 are arranged on the upper side of the rack and between it and a fixed portion of the frame. As shown in Figs. 4 and 6, a thumb-lever 110 is attached to a rod 111 which is journaled in the frame of the machine and provided with lateral arms 112 whose outer ends are pivoted to the ends of the rack 103. It is obvious that by operating this lever 110 the rack 103 may be raised against the tension of the springs 109 and thus cleared from the gears 104, 105, 106, and when the rack is thus supported, the carriage with the paper holder attached may be run from left to right or vice versa. When pressure on the lever 110 is released, it is obvious that the springs 109 will instantly force the rack back to normal working position indicated in several figures.

For the purpose of adjusting the gears 104, 105, 106, as above described, for engagement with any one of the racks a, b, c, as required, the sleeve 107, see Fig. 18, is connected with the two shafts 113 and 114, see Figs. 7 and 18. The shaft 113 is hollow and incloses the other (114). The latter is connected by links 115 with the sleeve 107, and the former, to wit, 113 is connected with the sleeves by a single link 115ª. When the hollow shaft 113 is rotated in the direction of the arrow Fig. 18, the small gear 106 will be drawn into engagement with rack b and thus the machine would print a single letter, and when the sleeve 107 is drawn still farther by the continued rotation of shaft 113, the gear 106 will be taken out of engagement with the rack $b$ and the largest gear 104 engaged with the rack $a$ for printing three letters. On the other hand, when the solid or inner shaft 114 is rotated in the opposite direction as indicated by arrow Fig. 18, the gears 104, 106 will be out of engagement with the rack and second largest gear 105 will be in mesh with rack $c$ whereby two letters will be printed. The shafts 113 and 114 arranged lengthwise of the machine are operatively connected with the shafts 56, 57 on the right and the corresponding shaft $56^a$ and $57^a$ on the left of the keyboard. Thus when a key 62 is depressed, three letters will be printed, and when a key 63 is depressed, two letters will be printed. In other words, the carriage will be moved and carry the paper-holder to the required place for effecting printing of single, double, or triple letters, as required.

The means for operating the carriage 100 and thereby moving the printing cylinder 2 by means of the gearing described, are as follows: As shown in Fig. 15, what is termed an escapement 115, the same being practically an enlarged ratchet wheel, is mounted on an axis 116 upon which is keyed a large spur gear 117 that meshes with a pinion 118, and the latter, as shown in Fig. 5, is keyed upon the shaft 108, whereon the gears 104, 105, 106 are mounted. The escapement is provided with a coiled retracting spring 119. Beneath the escapement is arranged a shaft 120 which is provided at its ends with lateral prongs 121, $121^a$. With this shaft, the side shafts 13 and $13^a$ are adapted to engage and also the solid shafts 122, $122^a$ which extend through the hollow shafts 13 and $13^a$. The hollow shafts are provided with lateral prongs 123 and $123^a$, which engage the prongs projecting from shaft 120, and the solid shafts 122, $122^a$ are similarly provided with prongs 124, $124^a$. It is apparent that if a hollow shaft 13 or $13^a$ is rotated in direction of the arrow, Fig. 15, the adjacent shaft 120 will be rotated in turn and this will change the position of two stop pawls 125 and 126 which are attached to the shaft and are adapted to alternately engage the teeth of the escapement or ratchet 115. The pawl 125 is rigidly attached to the shaft and provided with a lateral prong or shoulder 127, while the pawl 126 is pivoted to the shaft and provided with a spring 128 which normally holds it in the position shown in Figs. 16 and 17. The spring 119 exerts a constant tension which is resisted by the engagement of the ratchet 115 with one or the other of the pawls 125, 126.

In Fig. 15 the pawl 126 is shown engaging a tooth and the other pawl 125, which is arranged laterally therefrom, is out of engagement. If, now, the shaft 120 be rotated, the pawl 126 will slip a tooth of the escapement and allow the ratchet or escapement 115 to rotate the distance between the adjacent teeth. In such rotation of the shaft 120 the pawl 125 is brought in engagement with the next tooth as shown in Fig. 16, the pawl 126 being thus carried to the left and free of the teeth. The shaft 120 is rotated back to its original position by spring 129 (see Fig. 15). At the next rotation of the shaft 120 the other pawl will engage the ratchet.

It will be seen that the lug or shoulder 127 of the pawl 125 prevents the hinged pawl 126 from passing too far back, and a stop 130 is provided for the hinged pawl 126 to prevent the spring 128 pulling it too far. The shaft 120 and the escapement 115 are operated whenever a key of the keyboard is depressed, since the hollow shafts 13 and $13^a$ are connected as before described with the front shafts 10, $10^a$ and transverse shafts 4 and $4^a$ as before described, see Fig. 7. The solid shafts 122, $122^a$ are connected with and operated by spacer keys 131 and $131^a$, on opposite sides of the machine, the same being connected with a lateral lever attachment 132 of said shaft, as shown in Fig. 7. Thus the escapement 115 is operated whenever a key of the regular keyboard is depressed and also when the spacer key is depressed.

The means for automatically returning the carriage and with it the paper-carrier or holder, are as follows: As shown in Fig. 29, an air-reservoir 133, a pump 134, and a piston cylinder 135 are arranged parallel and operatively connected by means of pipes 136 and 137. That is to say, the pump 134 is connected to the reservoir 133 by pipes 136 and pipe 137 connects such reservoir with the piston cylinder 135. A cock 138 is arranged in the pipe 137 and connected by link and lever 139 with a rock shaft 140 which is in turn connected with a sliding bar 141 arranged in keepers and extending along the back of the frame. Such bar is provided at its right hand end with rack teeth $141^a$ with which a gear 142 engages. This gear is operatively connected with trip mechanism which is operated by the carriage in a manner as will be presently described. The piston of cylinder 134 of the air pump is connected by a rod 143 and an angular rod 144 with the rack 21 before described and the piston rod 145 of cylinder 135 is connected by a rod 146 with the carriage 100 as shown in Fig. 5. It is apparent that by reciprocation of the rack 21, the air pump 134 will be operated so that air will be forced through one or the other of the pipes 136 into the reservoir 133. It will be understood that the piston in the air pump cylinder 134 is so arranged and the cylinder so provided with valves and ports that air will be forced in one direction by the piston while another quantity of air is being drawn in behind the piston. When the carriage reaches the limit of its movement in one direction, it operates the pinion or gear 142 through the medium of trip mechanism and thus the rack bar 141 is moved so as to turn the cock 138 and admit air from reservoir 133 into the cylinder 135 whereby the piston will be forced to the right and through its connection with the carriage the latter will be retracted.

The trip mechanism before referred to is illustrated in Figs. 28 and 29. On the outer side of the back portion 147 of the frame a trip lever 148 is fixed on the shaft of gear or pinion 142, and is held normally in the position shown in Fig. 28 by means of a stop and a spring 149. A shaft 87 projects laterally from the carriage as has been before described and it is so arranged as to come into contact with and trip the lever 148 forcing it back to the position indicated in Fig. 29, whereby the rack bar 141 is caused to operate the cock 138 through the medium of shaft 140. The rack 90 is secured to a vertical piece 150 and a screw 151 works in a slot 152 in the back piece 147 and holds the piece 150 in the required manner. A slot 153 is provided in the lower portion of the back piece 147 in which the shaft of gear 142 is adapted to slide.

The ribbons 64 forming part of the printing mechanism and having different colors are adapted to be shifted up and down in front of the printing cylinder 2. For this purpose they run from the drums 65', see Figs. 2, 4, 8, 12, around spools 154 which are adjustable vertically upon guide rods. A hand lever 155 is pivoted behind the drums 65' and adapted to engage at its outer end a ratchet 156 while its inner end is connected with the spools 154. It is obvious that by shifting the free end of the lever 155 up or down the ribbons may be adjusted accordingly. Provision is also made for moving the ribbon in one direction or the other. For this purpose the drums 65' within the casing 65 are mounted on vertical shafts 157, the lower ends of which are provided with bevel pinions 158 that are adapted to engage corresponding pinions 159 on a long horizontal shaft 160. This shaft has a length greater than the distance between the drum shafts 157, so that one pinion 158 is in gear when the other is out of gear. Either pinion 159 may be put in gear according to the direction in which it is desired the ribbons shall move. To hold the gears 158, 159 engaged, I provide crank arms 161, 162 at the respective ends of the machine, see especially Figs. 8 and 9. As shown, the crank 161 is adjusted to bear on the right hand end of the shaft 160, while the crank 161 at the opposite end is turned down into horizontal position. Thus, the ribbons are being driven by the drum at the right hand side of the machine as shown in Figs. 8 and 9.

Rotation is imparted to the shaft 160, for driving either of the ribbon shafts 157, by means illustrated in Figs. 9, 24 and 27. Worm gearing 162 operatively connects said shaft 160 with a short shaft 163 whereon pinions 28 and 28$^a$ are keyed, the same being in turn geared with segments 20 and 20$^a$. As before described the gear 30, see Figs. 7 and 24, which is keyed on the shaft 163 is in mesh with the rack 21 by which the printing cylinder 2 is moved in one direction, such movement being effected to the right by means of segment 20, while the movement in the opposite direction or to the left is effected by segment 20$^a$, see Fig. 12. These segments are tripped and then rotated by springs as before described. For the purpose of resetting the segment 20, I employ a wheel 164, see Figs. 3 and 7, which is provided with a series of radial teeth that are adapted to engage a lug 165, projecting from the hub of the segment 20. The toothed wheel 164 is keyed on the shaft 108 and is, therefore, rotated with it. It will be understood that when the segment gear 20 is thrown to the left as shown in Fig. 7, its lug 165 will be thrown into position for engagement of the teeth of the wheel 164, but that such engagement will not otherwise occur. For resetting the opposite segment 20$^a$, a similar wheel 164$^a$ is employed; see Figs. 3 and 12. The teeth of this wheel are adapted to engage a pivoted lever 166 which is in turn adapted to engage a lug 167 formed on the hub of segment 20$^a$. The operation of resetting the segment 20$^a$ is, therefore, practically the same as in the case of segment 20. A ratchet and pawl 168$^a$ are applied to the wheel 164$^a$ and its shaft 108 in such manner that the wheel will rotate with the shaft only in the direction indicated by arrow in Fig. 12, but will at other times remain idle or neutral. Another toothed wheel 169, see Figs. 3, 13, and 18 is keyed on the shaft 108 and is arranged for resetting the lever 94, see also Fig. 24. This lever as before described is connected by rod 93 with the paper holder and carrier and when set against the tension of the spring 95, it is supported by the pivoted dog 96. A pivoted lever 170, see Figs. 13 and 18, is arranged for engagement with a lug 171 formed on the said lever 94, and the radial teeth of the gear 169 are adapted to engage the outer end of such lever and thereby raise its inner end which underlies the lug 171 and thus raise the outer end of lever 94 so that the spring of the dog or trip 96 may restore it to the locking position indicated in Fig. 18. Thus with the rotary movement of the toothed wheel 169 the distance between two adjacent teeth, the lever 99 is reset and the paper holder and carrier 72 thereby tilted back to its normal position indicated in Figs. 4 and 5.

The segments 20 and 20ª by which the gear 30 meshing with the cylinder rack 21 is rotated in opposite directions, are mutilated, that is to say, are provided with a smooth or toothless portion at one end. Thus, as shown in Fig. 7, such smooth or toothless portion of the segment 20 is directly opposite the pinion 28. Consequently, such pinion and the gear 30 might be operated by the opposite segment 20ª without interference of the pinion 28 with the segment 20. It will be understood that in their normal position, both segments 20 and 20ª are practically out of engagement with the respective pinions 28 and 28ª, and are brought into mesh with such pinions only when tripped and operated by their respective springs.

The resetting gear 39 by which the printing-cylinder shaft 23 is rotated, is accomplished by the following mechanism. A lever 172 (see Figs. 3, 12, 14) is pivoted in horizontal position and its upturned end is adapted to engage the teeth of the wheel 164ª, the opposite end being connected by a link 173 with the lever 143, which actuates the segment gear 39. When the dog 44 is tripped and the lever 43 and its connected gear 39 thereby released, the upturned end of the lever 172 drops into such position that it is engaged by teeth of wheel 164ª, whereby the opposite end of the lever 172 is lowered and the lever 43 is forced back to its horizontal position and reëngaged with the dog 44.

What I claim is:

1. The combination of a printing cylinder adapted to reciprocate, and movable keys, rock-shafts connected with the keys and operated thereby, the same being arranged transversely of the keyboard, a rack-bar connected with the cylinder for sliding it, a gear in mesh with said rack, a spring-actuated segment gear operatively connected with such rack gear, a device for locking the segment gear, and automatic releasing mechanism connected with the shafts operated by the keys, substantially as described.

2. The combination of a printing cylinder adapted to reciprocate, movable keys divided into two groups transversely of the machine, rock-shafts arranged beneath and connected with the keys of the respective groups and operated thereby, the same being arranged transversely of the keyboard, a rack-bar connected with the cylinder for sliding it, a gear in mesh with said rack, two spring-actuated segment gears, a shaft whereon such segment gears are mounted and two pinions also keyed thereon, and meshing with said segment gears by which they are operated in opposite directions, devices for locking such segment gears, and automatic releasing mechanism connecting the respective gears with the groups of keys on opposite sides of the keyboard, whereby the depression of a key in one group moves the printing cylinder in one direction and the depression of a key in the other group moves the same in the opposite direction, substantially as described.

3. The combination of a printing cylinder adapted to reciprocate, movable keys and rock-shafts arranged transversely beneath the same and operatively connected therewith, a rack-bar connected with the printing cylinder for sliding it, a gear in mesh with said rack, a spring-actuated segment gear operatively connected with such rack-bar, a pivoted dog adapted to engage the segment gear for locking it in the normally retracted position, a spring bearing on said dog and holding it in normal engagement with the segment, a trip bar having retracting springs and arranged for releasing the dog from the segment, such bar being operatively connected with the transverse shafts before named, substantially as described.

4. The combination of a printing cylinder adapted to slide, movable keys, rock-shafts arranged beneath the same and connected therewith, a rock shaft arranged at the front of the keyboard parallel thereto, such shaft and the transverse shafts being provided with engaging prongs, a third rock shaft arranged at the end of the machine parallel thereto and in operative engagement with the front shaft, a sliding bar with which such end rock-shaft is connected, a rack-bar connected with the cylinder, spring-actuated gearing for operating the same, a pivoted dog for locking such gearing, the aforesaid bar being connected with the dog whereby, when a key is depressed, the bar is slid and the gearing tripped, substantially as described.

5. The combination of a printing cylinder adapted to slide endwise, catches for holding it in normal median position, rock-shafts arranged transversely beneath the keyboard and operatively connected with such catches whereby when the shafts are rocked a catch is released, and depressible keys operatively connected with such rock-shafts, substantially as described.

6. The combination of a printing cylinder, a rock-shaft whereon it is adapted to slide and with which it rotates, a drum mounted on the same shaft and provided with a series of projections serving as stops, pivoted lock bars arranged in guides and adapted, when duly adjusted, to engage the said stops for arresting the rotation of the cylinder at any desired point, a series of depressible keys, and mechanism operatively connecting such lock bars with the keys, whereby depression of the latter changes the position of the lock bars correspondingly and engages them with the drum, and means for rotating the drum and thereby the printing cylinder, substantially as described.

7. The combination with movable keys, a rotary cylinder having printing characters arranged thereon corresponding to those on the keys, means for rotating the cylinder, a rotary drum keyed on the same shaft with the cylinder so as to rotate therewith, a spring-actuated segment lever connected with such drum, a pivoted lever connected with such segment, a pivoted dog for locking the said lever, and mechanism for tripping said dog to release the lever and the segment, thus allowing the latter to rotate the drum and cylinder, such mechanism being operatively connected with the keys so that the depression of any one of the latter will effect rotation of the cylinder to a greater or less degree, corresponding to the position of the depressed key from front to rear of the keyboard, as shown and described.

8. The combination with a printing cylinder adapted to rotate a shaft whereon it is mounted, a drum keyed on such shaft, movable devices adapted to engage projections on the drum for arresting the rotation of the cylinder at any desired point, cams arranged for elevating such devices more or less according to the character to be printed, a keyboard comprising depressible keys, and mechanism operatively connecting them with the said cams whereby the latter are rotated, and means operatively connecting the keys and drum for rotating it, substantially as described.

9. The combination with a keyboard comprising depressible keys, a rotary and slidable printing cylinder, a splined shaft whereon it is mounted, means operatively connecting the cylinder with the keys whereby the former may be moved right or left, a drum keyed on the cylinder shaft, means for rotating the drum and cylinder, the same being operatively connected with the keys, a series of pivoted lock bars arranged in guides and adapted to engage projections on the drum, a base piece to which such lock bars are pivoted, cams arranged beneath such base pieces for raising them to elevate the lock bars more or less according to the character to be printed, means operatively connecting the lock bars with the keys, whereby the latter may be drawn forward into contact with the drum, and means for operating the cams for raising the lock bars bodily, as required for printing certain characters, substantially as described.

10. The combination of a keyboard having depressible keys provided with a series of characters to be printed, a rotatable and slidable cylinder having its periphery provided with corresponding characters, a slidable multiple rack and means for connecting it with the cylinder, a series of differential gears meshing with the aforesaid rack, a slidable sleeve whereon said gears are mounted, and means operatively connecting such sleeve with depressible keys, whereby the gears may be shifted so that any one may engage a portion of the rack while the others are out of mesh according as it is required to print a single-letter, or two-letter, or three-letter syllables, substantially as described.

11. The combination of a rotatable and slidable printing cylinder, and a multiple rack connected therewith, a series of gears adapted for engagement separately with the rack, a rotatable shaft for operating said gears, a slidable sleeve whereon they are keyed, a hollow and solid shaft and pivoted links connecting them with the said sleeve, whereby the sleeve with its attached gears is adjusted in one direction or the other according as the hollow or solid shaft is rocked, a hollow and solid side shaft operatively connected with the aforesaid hollow and solid shafts, and two depressible keys, one connected with the hollow side shaft and the other with the solid side shaft, substantially as described.

12. The combination with a keyboard comprising depressible keys, a printing cylinder which is rotatable and slidable, a multiple rack connected with the cylinder, a series of differential gears adapted to engage the said rack, the gears being mounted on a slidable sleeve, a rotatable shaft whereon said sleeve is mounted, an escapement comprising gearing, a ratchet disk, and a spring, the same being keyed on the aforesaid shaft, a rock-shaft arranged below the escapement and provided with a fixed and spring dog for alternately engaging the teeth of the ratchet, and means operatively connecting the dog shaft with the keys, substantially as described.

13. The combination of depressible keys, a slidable and rotatable printing cylinder, and means for operatively connecting them, a tiltable paper-holder, a spring-actuated hammer, and means connected with the paper-holder for retracting the hammer, and means connected with the keys for tilting the paper-holder, substantially as described.

14. The combination of movable keys, a slidable and rotatable printing cylinder, a pivoted spring-actuated paper-holder, means for holding it normally in the retracted position, a spring-actuated hammer which is held normally in retracted position by engagement with the paper-holder, means connected with the keys for tripping the paper-holder and thereby releasing the hammer, substantially as described.

15. The combination of movable keys, a slidable and rotatable printing cylinder, a pivoted paper-holder and means connected with it for feeding the paper automatically and intermittently, means for locking the paper-holder in retracted position, and means connected with the keys for tripping the same, a spring-actuated hammer pivoted to a fixed support, a dog pivoted on the same support and adapted to engage the hammer for locking it retracted, the paper-holder being provided with means for retracting the hammer and tripping the dog, substantially as described.

16. The combination of movable keys, a slidable printing cylinder, a rack connected therewith, and gearing connected with the rack and including a spring-actuated segment gear, means for retracting it to its normal locked position, the same comprising a toothed wheel, a spring escapement for actuating the wheel and a projection on the segment gear with which the teeth of said wheel are adapted to engage when the gear is in the abnormal position, substantially as described.

17. The combination with depressible keys, a slidable and rotatable cylinder and means for operatively connecting them, means for directly rotating said cylinder the same including a spring actuated segment gear, and a lever for operating the same, a dog supporting said lever in normal position and thereby locking the segment gear, means connecting such dog with the keys whereby the dog may be tripped for releasing the gear, and resetting mechanism comprising a toothed wheel 164$^a$, a rotary shaft and a spring escapement mounted thereon, and a pivoted lever 172 one end being upturned to adapt it for engagement with said toothed wheel and its opposite end being connected with the lever which operates the segment gear, substantially as described.

HENRY GAYLORD McCOOL

Witnesses:
J. L. REA,
E. G. FLEIMKEN.